United States Patent [19]

Emmons et al.

[11] Patent Number: 5,349,026
[45] Date of Patent: Sep. 20, 1994

[54] REACTIVE COALESCENTS

[75] Inventors: William D. Emmons, Huntingdon Valley; Daniel A. Bors, Warminster; Andrew J. Kielbania, Jr., Chalfont, all of Pa.

[73] Assignee: Rohm and Haas Company, Philadelphia, Pa.

[21] Appl. No.: 979,118

[22] Filed: Nov. 20, 1992

[51] Int. Cl.$^5$ .................. C08F 116/36; C08F 216/36; C08F 8/14; C08F 8/32

[52] U.S. Cl. .................. 525/328.6; 525/329.9; 525/330.5; 525/331.1; 525/374; 525/379; 525/383; 525/386

[58] Field of Search .......... 524/556, 558, 560; 525/326.1, 386, 383, 329.9, 330.5, 331.1, 374, 328.6, 379; 428/500

[56] References Cited

U.S. PATENT DOCUMENTS

| | | | |
|---|---|---|---|
| 3,520,843 | 7/1970 | Moody et al. | 525/386 |
| 3,753,709 | 8/1973 | Staudenmayer et al. | 430/32 |
| 4,100,133 | 7/1978 | Emmons et al. | 524/556 |
| 4,141,868 | 2/1979 | Emmons et al. | 524/532 |
| 4,217,396 | 8/1980 | Heckles | 528/306 |
| 4,296,226 | 10/1981 | Braun et al. | 524/558 |
| 4,906,684 | 5/1990 | Say | 524/548 |
| 4,987,186 | 1/1991 | Akiyama et al. | 525/379 |
| 4,988,762 | 1/1991 | Overbeek et al. | 525/329.9 |
| 5,002,998 | 3/1991 | Carey et al. | 525/329.9 |
| 5,182,327 | 1/1993 | Biale | 524/556 |
| 5,296,530 | 3/1994 | Bors et al. | 525/379 |

*Primary Examiner*—Paul R. Michl
*Assistant Examiner*—Tae H. Yoon
*Attorney, Agent, or Firm*—Ronald D. Bakule

[57] ABSTRACT

A coating or impregnating composition containing an aqueous dispersion of a vinyl addition polymer and a reactive coalescent is provided. The reactive coalescent contains at least one acetoacetate grouping, or an enamine thereof. In one embodiment the reactive coalescent also functions as an emulsion polymer crosslinker.

8 Claims, No Drawings

REACTIVE COALESCENTS

FIELD OF THE INVENTION

This invention relates to a coating or impregnating composition incorporating an aqueous dispersion of a vinyl addition polymer and a reactive coalescent, and cured polymer compositions derived therefrom.

BACKGROUND OF THE INVENTION

This invention relates to improving the properties of film forming vinyl polymers. These polymers have many uses particularly in coating and impregnation applications and are most useful as dispersions in water. Making water-based coatings or impregnants with polymers having low Tg values enables the aqueous-based paint to be applied at normal room temperatures without the use of a plasticizer but results in films which in many cases are inadequately hard and tough after drying, at least for some applications. In many cases, however, it is desirable to achieve the hardness, block resistance, solvent resistance, and print resistance of a hard film. To accomplish this a polymer with a glass transition temperature (Tg) above about 30° C. is required and such polymers require a coalescent or fugitive plasticizer to yield coherent films at ambient temperature or below.

Conventional coalescents such as butyl CELLOSOLVE®, butyl CARBITOL®, TEXANOL®, and the like are useful to facilitate film formation from hard polymers (Tg substantially above room temperature) and even from soft polymers (Tg less than room temperature) when film formation is required at temperatures lower than normal room temperature. However, after film formation is complete the coalescent evaporates at a rate depending on its boiling point and may generate odor and pollution problems.

The composition of this invention overcomes these disadvantages by incorporating a "reactive coalescent" which, as defined herein, after it has facilitated film formation, does not substantially evaporate but reacts to become part of the film.

DESCRIPTION OF THE PRIOR ART

U.S. Pat. No. 4,141,868 discloses a reactive coalescent, dicyclopentenyloxy ethyl methacrylate which is a good coalescent and subsequently cures in the film by air oxidation. However, this material may cause odor problems and film embrittlement on aging.

An object of this invention is to provide a composition incorporating a low-toxicity, non-odiferous, substantially nonvolatile reactive coalescent which does not cause film embrittlement.

Another object of this invention is to provide a low-toxicity, non-odiferous, substantially nonvolatile reactive coalescent which also functions as a emulsion polymer crosslinker.

A further object of this invention is to provide a reactive coalescent which leads to coating films, derived from aqueous vinyl polymer dispersions, with improved print resistance, block resistance, solvent resistance, and/or film toughness.

SUMMARY OF THE INVENTION

A coating or impregnating composition containing an aqueous dispersion of a vinyl addition polymer and a reactive coalescent, which coalescent contains at least one acetoacetate grouping, or certain related enamines thereof, is provided. In one embodiment the reactive coalescent also functions as an emulsion polymer crosslinker.

DETAILED DESCRIPTION OF THE INVENTION

This invention is directed to a coating or impregnating composition containing an aqueous dispersion of a vinyl addition polymer and a reactive coalescent, which coalescent contains at least one acetoacetate grouping, or certain enamines thereof. Also provided is a method for improving the coalesence of an aqueous dispersion of a polymer by using the reactive coalescent.

The ability of an aqueous dispersion of a vinyl addition polymer to form a film depends upon the glass transition temperature of the dispersed polymer and the temperature at which the coating is allowed to dry, as is disclosed in U.S. Pat. No. 2,795,564, hereby incorporated herein by reference. The dispersed polymer is preferably obtained by emulsion polymerization of one or more monoethylenically unsaturated monomers and will have a glass transition temperature which depends, inter alia, upon the identity of the components and the proportions of the monomers in the polymer. Certain ethylenically unsaturated monomers such as, for example, methyl methacrylate, styrene, vinyl acetate, vinyl chloride, acrylonitrile, vinyl toluene, methacrylonitrile, and vinylidene chloride, produce homopolymers which have relatively high glass transition values, that is, polymers having a glass transition temperature above about 20° C. On the other hand, numerous ethylenically unsaturated monomers such as, for example, acrylic ester monomers including methyl acrylate, ethyl acrylate, butyl acrylate, 2-ethylhexyl acrylate, decyl acrylate, butyl methacrylate, isodecyl methacrylate, and hydroxyethyl acrylate; butadiene, and chloroprene produce relatively soft homopolymers, i.e., polymers having glass transition temperatures of about 20° C. or less.

By copolymerizing various hard and/or soft monomers a polymer suitable for coating or impregnating uses may be obtained having a glass transition temperature (Tg) from below about −40° C. up to about 150° C. or higher. The polymer may also incorporate other monomers capable of addition polymerization such as, for example, functional monomers as methacrylic acid, hydroxyethyl acrylate, dimethylaminoethyl methacrylate, dimethylaminopropyl methacrylamide, sulfoethyl methacrylate, and the like; multi-ethylenically unsaturated monomers such as 1,4-butyleneglycol dimethacrylate, diallyl phthalate, divinyl benzene, and allyl methacrylate, to an extent that film formation is not unduly compromised; and the like. Coating or impregnant compositions incorporating such polymers may be made with good film-forming qualities if the Tg value of the polymer is not above the temperature at which the coating or irapregnant is dried. For example, aqueous-based paints containing a polymer having a Tg value of about 15° C. generally can be applied at room temperature and result in good film formation simply by drying of the coated film in the ambient atmosphere. On the other hand, if the coating composition contains as its primary film-forming component an emulsion polymer having a Tg value above room temperature, such as about 35° C. and up, the coated film may require elevated temperature, such as 35° C. and up, during drying in order to assure that the polymer particles are adequately coalesce or fused into a continuous coherent film. Some polymers may be characterized by a Tg substantially above room temperature such as up to 30°–35° C. but still would be capable of forming a continuous film at normal room temperatures because of an affinity for water (hydrophilicity) of a copolymerized monomer such as, for example, vinyl acetate in the dispersed polymer particles. The hydrophilicity of polymer as a result of a substantial amount of vinyl acetate (or equivalent monomer) may aid in coalescing the polymer particles into a continuous film at temperatures lower than the nominal Tg of such polymer.

Glass transition temperatures of copolymers can be readily calculated using the Fox equation (T. G. Fox, *Bulletin American Physical Society*, Volume 1, Issue 3, page 123(1956)). Polymer Tg is generally very close to the minimum film formation temperature (MFFT). The MFFT may be measured directly using a temperature-gradient bar.

The composition of this invention incorporates a reactive coalescent selected from substantially nonvolatile monofunctional or polyfunctional acetoacetate esters and the corresponding enamines (which may be made from the acetoacetate by reaction with ammonia or a primary amine). The acetoacetate esters can be represented by the generic formula I and the corresponding enamines by the generic formula II:

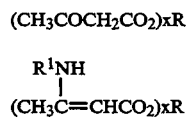

where R is a monovalent organic radical or a polyvalent organic radical. X is an integer from 1 to 6 whose value is equal to the valence of the organic radical R and $R^1$ is hydrogen or $C_1$–$C_{22}$ alkyl. These acetoacetates, and their enamines thereof, may be either oil- or water-soluble.

The acetoacetate reactive coalescents can be most conveniently prepared by reaction of the corresponding alcohol or polyol with diketene, with the thermal reaction of 2,2,6-trimethyl-4H-1,3-dioxin-4-one, or by transesterification with another acetoacetate (*Journal of Coatings Technology* 62, 101, October 1990).

Typical reactive coalescents include 1,4-butanediol diacetoacetate; neopentyl glycol diacetoacetate; 2,2,4-trimethyl 1,3-pentanediol diacetoacetate; 2-butane-1,4-diol diacetoacetate; 5-norbornene-2methanol acetoacetate; 1,3-butanediol diacetoacetate; 2,3-butanediol diacetoacetate; dipropyleneglycoldiacetoacetate; 2-methyl-2,4-pentanediol diacetoacetate; borneol acetoacetate; trimethylolpropane trisacetoacetate; sorbitol acetoacetate (various degrees of substitution); oxyethylated glycerol trisacetoacetate; 2,5-hexanediol diacetoacetate; 1,6-hexanediol diacetoacetate; acetoxyacetoethyl methacrylate; and the corresponding enamines from ammonia or ethanolamine. Acetoxyacetoethyl methacrylate (a monomer in its own right) is a substantially nonvolatile reactive coalescent and can be used in very similar fashion to other acetoacetates described above.

The enamines are spontaneously formed by addition of ammonia or primary amine to the acetoacetate in water. This can be done as a separate step or by addition of the amine or ammonia in proper amount to the aqueous coating composition. In general, addition of suitable amounts of amine brings the pH to about 9 and under these conditions enamine formation (as shown by ultraviolet spectrometry)is essentially complete. If acetoacetates from primary alcohols are used and the emulsion is required to undergo heat aging, conversion of the acetoacetate to an enamine may be important to prevent acetoacetate hydrolysis in water. This hydrolysis ultimately generates carbon dioxide and acetone as shown.

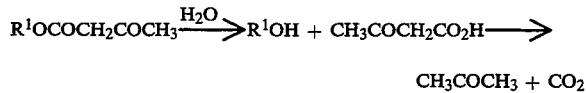

$$CH_3COCH_3 + CO_2$$

The enamines are not usually as effective as latex coalescents as are the less polar acetoacetates. However, they are still useful. If the presence of amine or ammonia is undesirable in the latex formulation, the hydrolysis problem may also be eliminated by use of acetoacetates derived from secondary or tertiary alcohols. Such acetoacetates are much less prone to hydrolysis, presumably because of steric factors.

The amount of reactive coalescent that is incorporated in the coating or impregnating composition may be from about 1% to about 200% by weight, based on the weight of the vinyl addition polymer. Preferred is the incorporation of about 5% to about 50% by weight, based on the weight of the vinyl addition polymer.

After film formation is complete these reactive coalescents do not substantially evaporate. Exposed to air, they may autoxidize and cure in the matrix of the film derived from the dispersed polymer. To facilitate a rapid cure it is often desirable to add a siccative or drier and an autoxidizable additive such as a drying oil or polyalkyl ether. The autoxidizable additive may be present at a level of 1–15% by weight, based on the weight of the vinyl addition polymer.

The drier may be any polyvalent metal-containing complex or salt that catalyzes the oxidative curing of drying oils or drying oil-modified alkyd resins. Examples of the driers are various polyvalent metal salts including calcium, copper, zinc, manganese, lead, cobalt, iron and zirconium as the cation. Simple inorganic salts are useful such as the halide, chloride, nitrate, sulfate. Salts of organic acids such as the acetylacetonate, acetate, propionate, butyrate and the like are also useful. The driers may also be complex reaction products of metal oxides, acetates, or borates and vegetable oils. Useful driers also include salts of naphthenic acids or of $C_8$ to $C_{30}$ aliphatic acids. Examples of the aliphatic or fatty acid component or anion of the drier salt is that of naphthenic acids, resinic acids (that is, rosin acids), tall oil fatty acids, linseed oil fatty acids, 2-ethylhexoic acid, lauric acid, palmitic acid, myristic acid, stearic acid, oleic acid, linoleic acid, linolenic acid, behenic acid, cerotic acid, montanic acid, and abletic acid. Preferred drier salts are those of cobalt and manganese, such as cobalt octoate, cobalt naphthenate and manganese octoate and naphthenate. Mixtures of various driers may be used. The driers mentioned in *Encyclopedia of Chemical Technology*, Kirk-Othmer, vol. 5, pp. 195–205, published by Interscience Encyclopedia, Inc., N.Y. (1950) may be used. The amount of the drier may be from about 0.0005 to about 2% metal content by weight of the reactive coalescent.

The drier may be added to the composition prior to storage provided such addition is made in the absence of oxygen or, alternatively, if a volatile stabilizer is included in the composition to inhibit or prevent the oxidizing action of the drier and the composition is then placed in closed storage containers to prevent volatilization of the inhibitor.

Thus, a volatile stabilizer may be used in coating compositions containing a reactive coalescent to prevent adventitious oxidation and crosslinking thereof in the formulated composition at any time prior to film formation. The volatile stabilizer must exhibit sufficient volatility under use conditions such as, for example, in thin films so as to not retard the development of film properties to any appreciable extent. The volatile stabilizer may be a volatile ketone-oxime obtained from ketones having 3 to 10 carbon atoms or an aldehyde-oxime derived from aldehydes having 1 to 10 carbon atoms. Preferred are methyl ethyl ketone-oxime, methyl butyl ketone-oxime, 5-methyl-3-heptanone-oxime, cyclohexanone-oxime, and butyraldehyde-oxime. The amount of volatile stabilizer may be from about 0.1% to about 2% by weight based on the weight of the reactive coalescent.

The autoxidizable additive, which may function as an aerobic radical source, may be a drying oil, a polyallyl ether (such as SANTOLINK XI 100, Monsanto Chemical Co.) or any of the autoxidizable components described in co-pending U.S. Ser. No. 07/633,302, hereby incorporated herein by reference. The autoxidizable additive may be used in an amount of about 1% to about 15% by weight based on the weight of the reactive coalescent. Simple esters of unsaturated fatty acids are preferred as the autoxidizable additive.

The reactive coalescents-acetoacetates or enamines-may also be cured by sunlight or by ultraviolet radiation. Ultraviolet radiation of wavelengths between 200 mm and 400 mm is particularly effective. Either oxidative cure or light-assisted cures are effective since these triggers are appropriate for formulation of one package stable coatings. Other curing agents may also be used such as, for example, formaldehyde and polyfunctional primary amines; however, these curing agents do not lend themselves to one package stable coatings.

In another embodiment it is possible to use the acetoacetate (I) or enamine (II) as a reactive coalescent crosslinker for co-curing with the aqueous dispersion of an addition polymer. This is particularly true when the latex polymer has pendant acetoacetate groups. Such latex polymers are described in co-pending U.S. Ser. No. 07/633,302. If the pendant acetoacetate functionality is introduced into the vinyl dispersion by copolymerization with acetoacetoxyethyl methacrylate, such polymers may contain 1–40% by weight of this monomer. These vinyl addition polymer dispersions are usually treated with equivalent amounts of ammonia or primary amine to form the enamine in order to prevent hydrolysis of the acetoacetate function during aging of the emulsion. When multifunctional acetoacetates or enamines are used coalescent activity may be lower but cure capability by air or light is enhanced and such systems co-cure and offer desirable combinations of print resistance, block resistance, and solvent resistance after cure is obtained. Analytical work on these films clearly shows disappearance of the reactive coalescent crossbinder as well as development of improved film properties.

The coating or impregnating compositions may additionally contain conventional materials such as, for example, pigments, extenders, dispersing agents, surfactants, sequestering agents, alefoaming agents, humectants, thickeners, defoamers, colorants, waxes, bactericides, fungicities, odor-modifying agents, and other resinous materials.

The coating or impregnant composition of this invention may be prepared by mixing the aqueous dispersion of an addition polymer with the reactive coalescent using conventional equipment such as, for example, a Cowles dissolver.

The coating or irapregnant composition of this invention may be applied to a wide variety of materials such as, for example, wood, cement or concrete, nonwoven or woven fabrics, aluminum or other metals, glass, ceramics, glazed or unglazed tiles, polyvinyl chloride and other plastics, plaster, stucco, and roofing substrates such as asphaltic coatings, roofing felts, synthetic polymer membranes, and foamed polyurethane insulation; or to previously painted, primed, undercoated, worn, or weathered substrates.

The coating or irapregnant composition of this invention may be applied by techniques well known in the art such as by paint brush, roller, air-assisted spray, airless spray trowels, and the like.

The following examples are intended to illustrate the coating or impregnating composition of this invention. They are not intended to limit the invention as other applications of the invention will be obvious to those of ordinary skill in the art.

GLOSSARY

The following abbreviations are used in these Examples and are to be understood as having the meaning set forth in this glossary. All percentages in these examples are percent by weight unless otherwise specified MEK—methyl ethyl ketone
PAGE—polyallylglycidylether (Santolink XI-100, Monsanto)
AAEM—acetoacetoxyethyl methacrylate
SR—swell ratio
g—grams
Hg—mercury
mm—millimeters
wt—weight
MFFT—minimum film forming temperature
cm—centimeter
h—hour

TEST PROCEDURES

The following test procedures were used to generate the data reported in the Examples below:

MEK Rub Resistance

Films were constantly soaked with methyl ethyl ketone. Data was obtained using a crockmeter with a 2 kg weight placed on the arm for a total weight of approximately 3000 g. The test ended when the breakthrough to the panel was first observed. Data were reported as double rubs (one set of back and forth).

Film Swell Ratio

Thin films were cast down on glass slides and a portion of the film was cut and removed from the glass slide (soaking the glass slide in warm water for a few minutes aids film removal). The film samples were measured in two directions (length and width). The samples were then soaked for 15 minutes in methyl ethyl ketone and remeasured. The increase in each dimension was averaged to yield an average numeric value for linear swell, and the result was then cubed to yield a volumetric swell ratio.

Print Resistance

Thin films were cast down on a black vinyl sheet and cured at ambient temperature. A layer of cheesecloth was then placed over the film and covered by a rubber stopper that had a surface area of approximately one square inch. A one kilogram weight was placed on top of the stopper. The resulting test sample was then placed in an oven for the reported time at the reported temperature (typically for two hours at 60° C.) and then cooled. The print was then rated on a scale of 1 to 10 (best) according to observed ease of removal of the cheesecloth and the depth of the imprint of the film.

Block Resistance

Thin films were cast down on black vinyl sheet and cured at ambient temperature. Two films were placed face-to-face and a one kilogram weight was placed on top. The resulting test sample was then placed in an oven typically for two hours at 60° C. and then cooled. The block was then rated on a scale of 1 to 10 (best) according to observed ease of separation of the films and film damage upon separation.

EXAMPLE 1

Coalescent Efficacy of Various Acetoacetate Reactive Coalescents

To 10 gram portions of an acrylic latex (45% solids content, Tg=44° C., MFFT=35° C.) was added the coalescent indicated in the Table below at the following levels: 0.23 grams (5 wt. %); 0.45 grams (10 wt. %); 0.67 grams (15 wt.%). The samples were equilibrated for 24 hours prior to determination of the visual minimum film forming temperature using a Sheen temperature gradient bar.

Reactive coalescent A was made from a mixture of 90 g. 1,4-butanediol, 500 g. methyl acetoacetate, 200 g. xylene and 0.7 g. of dibutyl tin oxide. This mixture was heated to reflux under nitrogen for 8 hours with removal of the distillate, and yielded 19% monosubstituted material.

Reactive coalescent B was made from a mixture consisting of 400 g. neopentyl glycol, 1298 g. methyl acetoacetate, 400 g. xylene and 1.0 g. dibutyl tin oxide. This mixture was heated to reflux under nitrogen for 8 hours with removal of the distillate. The mixture was cooled to 95° C. and a 0.5 mm Hg vacuum was applied for two hours to remove all volatile material. Analysis of the product mixture showed the presence of 81% disubstituted and 19% monosubstituted material.

Reactive coalescent C was made from a mixture of 140 g. 2,2,4-trimethyl-1,3-pentanediol and 300 grams of 2,2,6-trimethyl-4H-1,3-dioxin-4-one. This mixture was heated to 120° C. for 3 hours under nitrogen with removal of the distillate. The mixture was then cooled to 60° C. and a 0.4 mm Hg vacuum was applied for 2 hours to remove all volatile material, Analysis of the product mixture showed the presence of 44% monosubstituted and 56% disubstituted material.

Reactive coalescent D was made from a mixture of 500 g. 2-butene- 1,4-diol, 1350 g. methyl acetoacetate and 0.1 g. phenothiazine. This mixture was heated to reflux under nitrogen for 8 hours with removal of the distillate. The mixture was cooled to 97° C. and a 0.5 mm Hg vacuum was applied for two hours to remove all volatile material. Analysis of the product mixture showed the presence of 85% disubstituted and 15% monosubstituted material.

Reactive coalescent E was made from a mixture of 90 g. 5-norbornene-2-methanol, 250 g. methyl acetoacetate and 0.3 g. dibutyl tin oxide. This mixture was heated to reflux under nitrogen for 6 hours with removal of the distillate. The mixture was cooled to 96° C. and a 0.5 mm Hg vacuum was applied for two hours to remove all volatile material. Analysis of the product mixture showed >84% conversion.

Reactive coalescent F was made from a mixture of 99.6 g. 1,3-butanediol and 345 g. 2,2,6-trimethyl-4H-1,3-dioxin-4-one which was heated to 120° C. for 3 hours under nitrogen with removal of the distillate. The mixture was then cooled to 60° C. and a 0.4 mm Hg vacuum was applied for 2 hours to remove all volatile material. Analysis of the product mixture showed the presence of 31% monosubstituted and 69% disubstituted material.

Reactive coalescent G was made from a mixture of 98.0 g. 2,3-butanediol and 340 g. 2,2,6-trimethyl-4H-1,3-dioxin-4-one. This mixture was heated to 120° C. for 3 hours under nitrogen with removal of the distillate. The mixture was then cooled to 60° C. and a 0.4 mm Hg vacuum was applied for 2 hours to remove all volatile material. Analysis of the product mixture showed the presence of 38% monosubstituted and 62% disubstituted material.

Reactive coalescent H was made from a mixture of 240 g. 2-methyl-2,4-pentanediol, 600 g. methyl acetoacetate and 1.2 g. dibutyl tin oxide. This mixture was heated to reflux under nitrogen for 6 hours with removal of the distillate. The mixture was cooled to 96° C. and a 0.5 mm Hg vacuum was applied for two hours to remove all volatile material. Analysis of the product mixture showed the presence of 78% monosubstituted and 22% disubstituted material.

Reactive coalescent was made from a mixture of 97.0 g. borneol and 93.8 g. 2,2,6-trimethyl-4H-1,3-dioxin-4-one. This mixture was heated to 120° C. for 2 hours under nitrogen with removal of the distillate. The mixture was then cooled to 80° C. and a 0.4 mm Hg vacuum was applied for hours to remove all volatile material. Analysis of the product mixture showed >95% conversion.

TABLE 1.1

| | MFFT at various Reactive Coalescent Levels | | | |
| --- | --- | --- | --- | --- |
| Composition | Coalescent | 5 wt. % | 10 wt. % | 15 wt. % |
| 1 | TEXANOL | 19 | 9 | 3 |
| 2 | A | 19 | 11 | 5 |
| 3 | B | 18 | 10 | 3 |
| 4 | C | 19 | 12 | 6.5 |
| 5 | D | 17 | 9 | 4 |
| 6 | E | 18 | 11 | 4 |
| 7 | F | 18.5 | 11 | 4 |
| 8 | G | 21 | 12.5 | 6 |
| 9 | H | 19 | 12 | 4 |
| 10 | I | 16 | 10 | 3 |

Compositions 2–10 of this invention which contain reactive coalescents A-1 show coalescent efficiency similar to comparative composition 1 containing a non-reactive coalescent, TEXANOL(Eastman Kodak).

EXAMPLE 2

Coalescent Efficacy Using a Vinyl Acetate Latex and Various Acetoacetate Reactive Coalescents To 10 g. portions of a vinyl acetate latex (45% solids, Tg=32° C., MFFT=18° C.) was added the coalescent indicated in the Table below at the following levels: 0.23 grams (5 wt. %); 0.45 grams (10 wt. %). The samples were equilibrated for 24 hours prior to determination of the minimum film forming temperature.

TABLE 2.1

| MFFT as a Function of Reactive Coalescent Level | | | |
|---|---|---|---|
| Composition | Coalescent | 5 wt. % | 10 wt. % |
| 11 | Texanol | 7 | 2 |
| 12 | D | 8 | 3 |
| 13 | E | 8.5 | 4.5 |

Compositions 12 and 13 of this invention incorporating reactive coalescents D and E show coalescent efficiency similar to comparative composition 11 containing a non reactive coalescent (TEXANOL).

EXAMPLE 3

Coalescent Efficacy of Enamine Reactive Coalescent

Polymer (I) was prepared from a monomer mixture that contained 501.7 grams of water, 45.74 grams of sodium dodecyl benzene sulfonate (23% solution), 470.6 grams of butyl acrylate, 1001 grams of methyl methacrylate and 22.4 grams of methacrylic acid. From this monomer emulsion mixture, 47.2 grams was removed and added to a kettle containing a mixture of 1317.9 grams of water and 22.0 grams of sodium dodecyl benzene sulfonate heated to 85° C. under nitrogen. An initiator charge of 2.26 grams of sodium persulfate dissolved in 50 grams of water was added. Ten minutes later, the remaining monomer emulsion was gradually added over a three hour period along with 1.13 grams of sodium persulfate dissolved in 50 grams. After the three hour period, the emulsion was cooled to 60° C. and 0.7 grams of t-butyl hydroperoxide dissolved in 12.5 grams of water was added followed by 1.03 grams of isoascorbic acid dissolved in 12.5 grams of water. The latex was cooled to ambient temperature.

Reactive coalescent J was made from a mixture of 293.9 grams of trimethylolpropane and 1143.3 grams of tert-butylacetoacetate. This mixture was heated to 115° C. for 8 hours and tert-butyl alcohol was collected as the distillate. The reaction mixture was cooled to 60° C. and a 1 mm Hg vacuum was applied for 2 hours to remove all volatile material. The resulting product was trimethylolpropane trisacetoacetate.

Portions of the latex were neutralized to pH=9.5 with the base indicated in the Table below. To a 100 gram aliquot of the neutralized latex emulsion was added trimethylolpropane trisacetoacetate in the amounts indicated. A comparative series was also formulated using TEXANOL as the coalescent. For the amine neutralized materials, an additional one equivalent of amine based on acetoacetate was then added to ensure complete formation of the enamine of the trimethylolpropane trisacetoacetate. In these cases, the nominal weight percent of coalescent added was based on the weight of the enamine form of trimethylolpropane trisacetoacetate. The formulated emulsions were equilibrated for three days prior to determination of the minimum film forming temperature.

TABLE 3.1

| MFFT of Compositions containing enamine reactive coalescent | | | |
|---|---|---|---|
| Composition | Base | Coalescent | MFFT |
| 14 | ammonia | 0% | 48 |
| 15 | ammonia | 5% Texanol | 30 |
| 16 | ammonia | 10% Texanol | 19 |

TABLE 3.1-continued

| MFFT of Compositions containing enamine reactive coalescent | | | |
|---|---|---|---|
| Composition | Base | Coalescent | MFFT |
| 17 | ammonia | 15% Texanol | 9 |
| 18 | KOH | 5% J | 38 |
| 19 | KOH | 10% J | 25 |
| 20 | KOH | 15% J | 18 |
| 21 | ammonia | 5% J | 38 |
| 22 | ammonia | 10% J | 27 |
| 23 | ammonia | 15% J | 23 |
| 24 | ethanolamine | 5% J | 39 |
| 25 | ethanolamine | 10% J | 34 |
| 26 | ethanolamine | 15% J | 25 |

Compositions 18–26 of this invention containing enamine reactive coalescents (formed from reactive coalescent J and ammonia or primary amines) exhibit lower MFFTs than comparative composition 14 which has no coalescent. The coalescent power of the enamine reactive coalescents formed from reactive coalescent J is dependent on the amine used to form the enamine.

EXAMPLE 4

Curable Reactive Coalescents

Reactive coalescent K was made from a mixture of 182.0 grams of sorbitol, 900 grams of methyl acetoacetate and 1.0 grams of dibutyl tin oxide. This mixture was heated to reflux under nitrogen for 8 hours with removal of distillate. The mixture was cooled to 94° C. and all volatile material was removed under vacuum (1 mm Hg) over a two hour period. The product mixture was composed of 36% tetraacetoacetate, 42% triacetoacetate and 22% diacetoacetate.

Reactive coalescent L was made from a mixture consisting of 61.2 grams of dry glycerol and 0.75 grams of sodium hydroxide. This mixture was heated to 160° C. and 438.8 grams of ethylene oxide were added slowly over four hours. The mixture was cooled to 100° C. and 1.2 grams of phosphoric acid was added and the reaction was cooled. In a separate reaction, 300 grams of methyl acetoacetate, 1.4 grams of acetic acid and 2.0 grams of dibutyl tin oxide was added to the ethoxylated glycerol and the mixture was refluxed at 138° C. for 6 hours with removal of distillate. The mixture was cooled to 95° C. and a 0.5 mm Hg vacuum was applied for two hours to remove all volatile material to give the triacetoacetate.

Reactive coalescent M was made from a mixture consisting of 57.2 g. trimethylolpropane and 200 g. 2,2,6-trimethyl-4H-1,3-dioxin-4-one. This mixture was heated to 125° C. for 2.5 hours under nitrogen with removal of the distillate. Analysis of the product showed only the presence of triacetoacetate.

Polymer II was prepared from a monomer mixture that contained 505.6 grams of water, 18.1 grams of a 23% solution of sodium dodecyl benzene sulfonate, 1062.9 grams of butyl acrylate, 454.3 grams of methyl methacrylate, 25.7 grams of methacrylic acid, 171.4 grams of acetoacetoxyethyl methacrylate, 3.42 grams of n-dodecyl mercaptan. Then 40.0 grams of this monomer emulsion mixture was removed and added to a kettle containing a mixture of 1432.7 grams of water and 11.0 grams of a 2.3% solution of sodium dodecyl benzene sulfonate heated to 85° C. An initiator charge of 2.52 grams of sodium persulfate dissolved in 84.0 grams of water was added. Ten minutes later, the addition of remaining monomer emulsion was begun and continued gradually over a two hour period. After the two hour period, the emulsion was cooled to 60° C. and 0.8 grams of t-butyl hydroperoxide dissolved in 16 grams of water was added followed by 0.5 grams of sodium formaldehyde bisulfite dissolved in 16 grams of water. The latex was then cooled to ambient temperature.

To 200 grams of the polymer II was added 0.5 grams of TRITON X-405 (Union Carbide) and the emulsion was neutralized to pH=7 with ammonia. A premix consisting of 9 grams of diisopropyladipate, 9 grams of propylene glycol, 0.5 grams of Triton X-405 and 22.5 grams of a 2% aqueous mixture of Natrosol 250 MHR (Hercules) was also made. The coalescent in the amount listed below was then added to 3 grams of the premix and then added to 15 grams of the latex. The formulated emulsions were equilibrated overnight and then films were made on Bonderite B-1000 steel panels. The films were heated at 60° C. for three days to allow for film coalescence and then placed in a sealed container containing a large molar excess of a 37% aqueous formaldehyde solution for three days. The films were then removed, air dried and solvent rub resistance was obtained as a measure of the level of cure.

TABLE 4.1

Evaluation of compositions containing curable reactive coalescents

| Compo- | Coalescent Type | | | | MEK Solvent |
|---|---|---|---|---|---|
| sition | Oil soluble (Amt) | | Water Soluble (Amt) | | Rubs |
| 28 | none | | none | | 50 |
| 29 | M | 0.47 g | " | | 300 |
| 30 | C | 0.5 g | " | | 180 |
| 31 | none | | K | 0.46 g | 380 |
| 32 | M | 0.47 g | K | 0.46 g | 720 |
| 33 | C | 0.5 g | K | 0.46 g | 315 |
| 34 | none | | L | 1.03 g | 190 |
| 35 | M | 0.47 g | L | 1.03 g | 360 |
| 36 | C | 0.5 g | L | 1.03 g | 290 |

Compositions 29–36 of this invention containing reactive coalescents show improved cure over comparative example 28 without reactive additives.

EXAMPLE 5

Autoxidative Cure of Composition Containing Acetoacetate Reactive Coalescent

This example shows that a composition containing acetoacetate reactive coalescent and an acetoacetate functional polymer will cure by autoxidative processes.

Reactive coalescent N was made from a mixture consisting of 500 grams of d-sorbitol and 1300 grams of tert-butylacetoacetate. This mixture was heated to 105° C. for 8 hours and tert-butyl alcohol was collected as the distillate under reduced pressure. The reaction mixture was cooled to 60° C. and a 1 mm Hg vacuum was applied for 2 hours to remove all volatile material. Analysis of the resulting product indicated an average substitution of 3.2 acetoacetate functional groups per molecule.

A polymer (III) was prepared from a monomer mixture that contained 501.7 grams of water, 18.13 grams of Alipal CO-436, 149.4 grams of acetoacetoxyethyl methacrylate, 672.3 grams of butyl acrylate, 652.9 grams of methyl methacrylate and 19.4 grams of methacrylic acid. From this monomer emulsion mixture, 47.2 grams was removed and added to a kettle containing a mixture of 1317.9 grams of water and 8.74 grams of Alipal CO-436 heated to 85° C. under nitrogen. An initiator charge of 2.26 grams of sodium persulfate dissolved in 50 grams of water was added. Ten minutes later, the remaining monomer emulsion was gradually added over a three hour period along with 1.13 grams of sodium persulfate dissolved in 50 grams. After the three hour period, the emulsion was cooled to 60° C. and 0.7 grams of t-butyl hydroperoxide dissolved in 12.5 grams of water was added followed by 0.5 grams of isoascorbic acid dissolved in 12.5 grams of water. The latex was cooled to ambient temperature.

An additives solution consisting of 0.3 grams of Triton X-405 (Union Carbide), 4.1 grams of propylene glycol, 4.1 grams of diisopropyladipate, 5.11 grams of a 2% aqueous solution of Natrosol 250 MHR (Hercules), 0.68 grams of a 6% solution of cobalt (Intercar), 0.12 grams of methyl ethyl ketone oxime and 1.23 grams of linoleic acid were mixed. Mixed with this solution were the additives listed in the Table below (ethyl linoleate at 7 wt. % and Santolink XI-100 at 10 wt. %). The premix was then added to 100 grams of the latex that had been neutralized to an equilibrated pH=9.5 with ammonia. The formulations were mixed and equilibrated for 24 hours. Films were applied and air dried to give about 1–2 mil thick films. These were cured under ambient conditions and tested.

TABLE 5.1

Evaluation of cure of compositions containing acetoacetate reactive coalescent

| Comp | Reactive Coal. | Additional Crosslinker | Film Swell Ratios | | Print 28 days | Block 28 days |
|---|---|---|---|---|---|---|
| | | | 7 days | 28 days | | |
| 37 | none | none | 4.8 | 3.4 | 8 | 9 |
| 38 | J | none | 8.7 | 5.3 | 4 | 7 |
| 39 | J | ethyl linoleate | 4.0 | 2.8 | 6 | 5 |
| 40 | J | Santolink XI-100 | 3.9 | 3.4 | 8 | 9 |
| 41 | N | none | 5.6 | 5.8 | 3 | 1 |
| 42 | N | ethyl linoleate | 3.9 | 8.4 | 6 | 1 |
| 43 | N | Santolink XI-100 | 5.3 | 3.3 | 6 | 6 |

Note:
Santolink XI-100 (Monsanto) is a 10 equivalent polyallylglycidyl ether of MW = 1200.

Compositions 38–43 of this invention incorporating acetoacetate reactive coalescents and an acetoacetate functional latex show evidence of autoxidative cure with higher levels of crosslinker (compositions 39,40,42 and 43) showing cure comparable to a control film without reactive coalescent.

EXAMPLE 6

Rate of Autoxidative Cure of Composition Containing Acetoacetate Reactive Coalescent and Acetoacetate Polymer The rate of reaction of the multifunctional acetoacetate reactive coalescent J formulated with an acetoacetate functional polymer (III) in films from Example 5 was determined by dissolving the cured film in a known amount of dimethyl sulfoxide and analyzing for reactive additive J by high pressure liquid chromatography against calibration samples.

TABLE 6.1

| | Rate of autoxidative cure | | | |
|---|---|---|---|---|
| | Cure Time (days): | | | |
| | 1 | 7 | 14 | 28 |
| Composition | Weight % remaining in the film | | | |
| 38 | 9.6 | 5.2 | 2.5 | 0 |

TABLE 6.1-continued

| | Rate of autoxidative cure | | | |
| --- | --- | --- | --- | --- |
| | Cure Time (days): | | | |
| | 1 | 7 | 14 | 28 |
| Composition | Weight % remaining in the film | | | |
| 39 | 8.0 | 0 | 0 | 0 |
| 40 | 8.3 | 0.5 | 0.8 | 0 |

Compositions 38–40 of this invention are shown to have incorporated the reactive coalescent into the film.

EXAMPLE 7

Rate of Autoxidative Cure of Composition Containing Acetoacetate Reactive Coalescent and Nonfunctional Polymer A polymer (IV) was prepared by a similar procedure to polymer I from a monomer mixture that contained 501.7 grams of water, 45.74 grams of sodium dodecyl benzene sulfonate (23% solution), 747 grams of butyl acrylate, 727.6 grams of methyl methacrylate and 19.4 grams of methacrylic acid and 3.0 grams of n-dodecyl mercaptan.

Compositions were formulated and films made by a procedure similar to those of compositions 38–40 from Example 5 with non-functional polymer IV replacing acetoacetate functional polymer III. The rate of reaction of the reactive coalescents mixed with a non-functional polymer was determined by dissolving the cured film in a known amount of dimethyl sulfoxide and analyzing for the reactive additive by high pressure liquid chromatography against calibration samples. All three films showed complete loss of the reactive additives by seven days.

EXAMPLE 8

Curing Efficacy of Compositions Containing Enamine Reactive Coalescent

A polymer (V) was prepared from a monomer mixture that contained 501.7 grams of water, 45.74 grams of sodium dodecyl benzene sulfonate (23% solution), 74.7 grams of acetoacetoxyethyl methacrylate, 709.7 grams of butyl acrylate, 690.2 grams of methyl methacrylate, 19.4 grams of methacrylic acid and 2.99 grams of n-dodecyl mercaptan. From this monomer emulsion mixture, 47.2 grams was removed and added to a kettle containing a mixture of 1317.9 grams of water and 22.04 grams of sodium dodecyl benzene sulfonate heated to 85° C. under nitrogen. An initiator charge of 2.26 grams of sodium persulfate dissolved in 50 grams of water was added. Ten minutes later, the remaining monomer emulsion was gradually added over a three hour period along with 1.13 grams of sodium persulfate dissolved in 50 grams. After the three hour period, the emulsion was cooled to 60° C. and 0.7 grams of t-butyl hydroperoxide dissolved in 12.5 grams of water was added followed by 1.03 grams of isoascorbic acid dissolved in 12.5 grams of water. The latex was cooled to ambient temperature.

Aliquots (100 g) of polymer IV and polymer V were neutralized to pH=9.5 with ethanolamine. An additional 0.57 grams of ethanolamine was added to the polymer V portions for complete enamine formation. To one aliquot of each polymer was added 4.0 grams of reactive coalescent J and 1.9 grams of ethanolamine for complete enamine(reactive coalescent JE) formation. A premix consisting of 4 grams of propylene glycol and 1 gram of a 10% aqueous solution of OR-708 (Rohm and Haas) was then added. After a 24 hour equilibration period, films were applied on glass slides and vinyl sheet then air dried to give 1–2 mil thick coatings. The films were exposed for varying periods of time to ultraviolet radiation provided by 8 UVA-340 bulbs (Q-Panel Co) arrayed 16 inches above the films in a light box. Total radiation level above the films is 4.7 Joules/cm$^2$/hour. Film swell ratios in methyl ethyl ketone and print ratings of the unexposed and exposed films were made.

TABLE 8.1

| Curing of compositions containing enamine reactive coalescent | | | | | | |
| --- | --- | --- | --- | --- | --- | --- |
| | | Reactive | Film Swell Ratios | | Print Rating | |
| Comp | Pol. | Coal. | 24 h | 72 h | 0 h | 72 h |
| 44 | IV | none | dissolves | dissolves | 2 | 2 |
| 45 | IV | JE | dissolves | dissolves | 2 | 6 |
| 46 | V | none | 4.8 | 6.4 | 3 | 7 |
| 47 | V | JE | dissolves | 5.7 | 1 | 6 |

Composition 45 incorporating enamine reactive coalescent JE and polymer IV without AAEM, the print rating of the cured film improved versus comparative example 44. Composition 47 exhibits an improved swell ratio of the film compared to composition 46 without the enamine reactive diluent.

EXAMPLE 9

Hydrolysis Resistance of Reactive Coalescents

Reactive coalescent O was made from a mixture of 118.8 grams of 1,6-hexanediol and 323.0 grams of tert-butylacetoacetate. This mixture was heated to 100° C. under nitrogen for seven hours while all distillate was collected to give a liquid identified as 1,6-hexanediacetoacetate.

Reactive coalescent P was made from a mixture of 115.0 g. 2,5-hexanediol and 320.0 g. tert-butylacetoacetate. This mixture was heated to 100° C. under nitrogen for six hours while all distillate was collected to give a low melting solid identified as 2,5-hexanediacetoacetate.

A polymer VI was made from a monomer mixture of butyl acrylate, methyl methacrylate and methacrylic acid was formulated with 20 wt % based on polymer weight of the diacetoacetate indicated in Table 9.1. The pH of the samples were adjusted with dimethylethanolamine or ammonia to the indicated level. These were equilibrated overnight and the pH of the ammonia containing samples were readjusted to the listed value to ensure complete enamine formation. The samples were then sealed and heated at 60° C. for ten days and the pH after treatment was obtained. Hydrolysis of the acetoacetate/enamine functionality was determined by quantitative $^{13}$C NMR and listed as a percentage loss compared to the original material.

TABLE 9.1

| | Hydrolysis Resistance | | | | |
| --- | --- | --- | --- | --- | --- |
| Composition | Coalescent | Base | pH before | pH after | % Hydrolysis by $^{13}$C NMR |
| 48 | O | none | 2.9 | 2.6 | 33% |
| 49 | O | DMAE | 6.9 | 4.8 | 12% |
| 50 | O | DMAE | 9.0 | 6.5 | 37% |
| 51 | O | NH3 | 9.5 | 9.3 | <3% |
| 52 | P | none | 2.9 | 2.9 | 5% |
| 53 | P | DMAE | 6.9 | 6.0 | 4% |
| 54 | P | DMAE | 9.0 | 7.8 | 7% |
| 55 | P | NH3 | 9.5 | 9.4 | <3% |

The data show that acetoacetate functional material made from a secondary alcohol (compositions 52–55) is more hydrolysis resistant than material made from a primary alcohol (48–51). Formation of the enamine using ammonia (51 and 55) also gives hydrolysis resistant materials.

EXAMPLE 10

Acetoacetoxyethyl Methacrylate Monomer as a Reactive Coalescent

Acetoacetoxyethyl methacrylate was added to an acrylic latex polymer composed of methyl methacrylate, butyl acrylate, and methacrylic acid (45% solids content; MFFT=33° C.) at 3%, 6%, and 10% by weight based on the weight of polymer. The mixtures were then divided and one set was neutralized with ammonia to pH=9.5, thereby forming the enamine of AAEM, and the other set was neutralized to pH=7 with potassium hydroxide. After equilibration the MFFTs were measured; results are presented in Table 10.1.

TABLE 10.1

| AAEM monomer as a reactive coalescent | | |
|---|---|---|
| | MFFT | |
| % AAEM Monomer | as AAEM | as AAEM enamine |
| 0 | 33 | 33 |
| 3 | 23 | 25 |
| 6 | 14 | 17 |
| 10 | 6 | 8 |

AAEM monomer functions as a coalescent with the enamine form of the monomer being slightly less effective than the monomer itself.

EXAMPLE 11

Volatility of AAEM Monomer in Air-Dried Films

Acetacetoxyethyl metnacrylate was added to an acrylic latex polymer composed of methyl methacrylate, butyl acrylate, and methacrylic acid (45% solids content; Tg=0° C.) at 10% by weight based on the weight of polymer. The latex mixture was then neutralized to pH=9.5 with ammonia. A film was applied to a glass panels and dried under ambient conditions. The film was weighed periodically to determine the rate of loss of AAEM as a function of time; weight loss data are presented in Table 11.1.

TABLE 11.1

| Volatility of AAEM monomer in air-dried film | |
|---|---|
| Time (days) | % AAEM Remaining |
| 0 | 100 |
| 3 | 95 |
| 4 | 91 |
| 7 | 77 |
| 10 | 70 |

Substantial portions of AAEM remain in the film over an extended period of time, permitting AAEM to function as a reactive coalescent.

We claim:

1. A composition adapted to coat or impregnate a substrate comprising an aqueous dispersion of a vinyl addition polymer and about 1% to about 200% by weight, based on the weight of said polymer, of a reactive coalescent of formula II, $$[(CH_3COCH_2CO_2)_xR] \quad [I]$$

$$\underset{(CH_3C=CHCO_2)_xR}{R^1NH} \quad II$$

wherein R is a monovalent or polyvalent organic radical, X is an integer from 1 to 6 whose value is equal to the valence of the organic radical R and $R^1$ is hydrogen or $C_1$–$C_{22}$ alkyl.

2. A composition adapted to coat or impregnate a substrate comprising an aqueous dispersion of a vinyl addition polymer and about 1% to about 200% by weight based on the weight of said polymer, of a reactive coalescent of formula II, $$\underset{(CH_3C=CHCO_2)_xR}{R^1NH} \quad II$$

wherein R is a monovalent or polyvalent organic radical, X is an integer from 1 to 6 whose value is equal to the valence of the organic radical R and $R^1$ is hydrogen or $C_1$–$C_{22}$ alkyl;

further comprising about 0.0005% to about 2% by weight drier based on the weight said reactive coalescent.

3. The composition of claim 2 further comprising about 1% to about 15% by weight of autoxidizable additive based on the weight of said reactive coalescent.

4. The composition of claim 3 further comprising about 0.1% to about 2% by weight of volatile stabilizer based on the weight of said reactive coalescent.

5. The composition of claim 1 or claim 2 wherein said polymer has a glass transition temperature from about −40° C. to about 150° C.

6. The composition of claim 1 or claim 2 wherein said polymer comprises pendant acetoacetate groups.

7. The composition of claim 1 or claim 2 wherein said polymer comprises about 1% to about 40% by weight, based on the weight of said polymer, copolymerized acetoacetoxyethyl methacrylate.

8. A method for improving the coalescence of an aqueous dispersion of a vinyl addition polymer comprising admixing about 1% to about 200% by weight, based on the weight of said polymer, of a reactive coalescent of formula II, wherein R is a monovalent or polyvalent organic radical, X is an integer from 1 to 6 whose value is equal to the valence of the organic radical R and $R^1$ is hydrogen or $C_1$–$C_{22}$ alkyl.

* * * * *

UNITED STATES PATENT AND TRADEMARK OFFICE
CERTIFICATE OF CORRECTION

PATENT NO. : 5,349,026

DATED : September 20, 1994

INVENTOR(S) : William D. Emmons, Daniel A. Bors and Andrew J. Kielbania, Jr.

It is certified that error appears in the above-identified patent and that said Letters Patent is hereby corrected as shown below:

In claim 1 at column 16, line 12, please delete the square bracketed formula "[CH3COCH2CO2)xR]".

In claim 1 at column 16, line 12, please delete the square bracketed "I" located to the right of the formula.

In claim 8 at column 16, after line 56, please insert the following:

$$\begin{array}{c} R^1NH \\ | \\ (CH_3\ C{=}CH\ CO_2)_x\ R \\ || \end{array}$$

Signed and Sealed this

Ninth Day of May, 1995

*Attest:*

BRUCE LEHMAN

*Attesting Officer*     Commissioner of Patents and Trademarks